(12) United States Patent
Kimizuka (10) Patent No.: US 8,638,521 B2
(45) Date of Patent: Jan. 28, 2014

(54) SHINGLED RECORDING APPARATUS AND METHOD CAPABLE OF DETECTING DRIFTED-OFF WRITING

(75) Inventor: Akihisa Kimizuka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 13/311,417

(22) Filed: Dec. 5, 2011

(65) Prior Publication Data

US 2012/0162814 A1    Jun. 28, 2012

(30) Foreign Application Priority Data

Dec. 27, 2010    (JP) .................................. 2010-291254

(51) Int. Cl.
*G11B 21/02*    (2006.01)

(52) U.S. Cl.
USPC ............................................................ 360/75

(58) Field of Classification Search
USPC .................................. 360/31, 75, 77.06, 77.07
See application file for complete search history.

(56) References Cited

U.S. PATENT DOCUMENTS

| | | | |
|---|---|---|---|
| 5,694,265 A * | 12/1997 | Kosugi et al. | 360/77.05 |
| 5,978,170 A * | 11/1999 | Izumiya et al. | 360/77.08 |
| 6,079,043 A * | 6/2000 | Yoshiura et al. | 714/758 |
| 6,215,758 B1 * | 4/2001 | Horimai et al. | 369/275.3 |
| 6,223,247 B1 * | 4/2001 | Otsuka et al. | 711/4 |
| 2008/0266692 A1 | 10/2008 | Komoriya et al. | |

FOREIGN PATENT DOCUMENTS

| | | |
|---|---|---|
| JP | 2001-014606 | 1/2001 |
| JP | 2001-118343 | 4/2001 |
| JP | 2003-331403 | 11/2003 |
| JP | 2004-047023 | 2/2004 |
| JP | 2008-276875 | 11/2008 |

\* cited by examiner

*Primary Examiner* — Tan X Dinh
(74) *Attorney, Agent, or Firm* — Knobbe, Martens, Olson & Bear LLP (57) ABSTRACT

An information recording device includes a magnetic disk, a recording control module, a detection module, and a rewrite control module. Tracks are defined on the magnetic disk, each track includes servo regions including position information and data regions. The recording control module performs a control so that information is recorded on a first track by a recording method where recording is performed with adjacent tracks overlapped with each other. The detection module detects, based on position information acquired from a first servo region, whether a shift recording is performed so as to be shifted from a reference in a radial direction on the first track. The rewrite control module performs, when the shift recording is detected, a control so that information is re-recorded in a data region between a first servo region and a second servo region that precedes the first servo region.

6 Claims, 5 Drawing Sheets

● DRIFTED-OFF WRITING DETECTION POSITION

FIG. 5B

● DRIFTED-OFF WRITING DETECTION POSITION

SHINGLED RECORDING APPARATUS AND METHOD CAPABLE OF DETECTING DRIFTED-OFF WRITING

CROSS REFERENCE TO RELATED APPLICATION(S)

The present disclosure relates to the subject matters contained in Japanese Patent Application No. 2010-291254 filed on Dec. 27, 2010, which are incorporated herein by reference in its entirety.

FIELD

An embodiment of the present invention relates to an information recording device and an information recording method for recording information on a recording medium.

BACKGROUND

In recent years, various techniques have been developed to increase the recording capacity of magnetic disk devices. Among these techniques is a recording technique called "shingled-recording method." The shingled-recording method is a recording method in which information is recorded on a track that is an unit of recording in such a manner that overwriting is performed on part of an adjacent track (partial overwriting). In the shingled-recording method, a track group including plural adjacent tracks is defined as a unit of recording.

In the shingled-recording method, when information is to be newly recorded on a midway track of the tracks of a track group, it is impossible to subject only the midway track to rewriting. In this case, it is necessary that at least the tracks following the midway track be subjected to the rewriting. A technique for detecting an erroneous recording phenomenon called "drifted-off writing" to determine necessity of rewriting is known. The drifted-off writing is a phenomenon that information is recorded erroneously on a track that is adjacent to a true recording track due to a shift (drift) of the recording head during the recording. In this technique, whether rewriting is necessary or not is managed on a track-by-track basis and information is rewritten to a location where a determination "rewriting is necessary" was made. For example, information rewriting is performed on a recording track or a track adjacent to it.

However, in the shingled-recording method, information rewriting on a recording track and an adjacent track that is adjacent to the recording track and on which the recording track is overlapped cannot be performed efficiently or properly.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

According to one embodiment, there is provided an information recording device includes a magnetic disk, a recording control module, a detection module, and a rewrite control module. A plurality of tracks are defined on the magnetic disk, each of the plurality of tracks includes servo regions including position information and data regions. The recording control module is configured to perform a control so that information is recorded on a first track by a recording method where recording is performed with adjacent ones of the plurality of tracks overlapped with each other. The detection module is configured to detect, based on first position information acquired from a first servo region, whether a shift recording is performed so as to be shifted from a reference in a radial direction on the first track in parallel with the information recording on the first track. The rewrite control module is configured to perform, when the shift recording is detected, a control so that information is re-recorded in a data region between a first servo region and a second servo region that precedes the first servo region. The first servo region is related to the first position information based on which the shift recording is detected.

An embodiment will be hereinafter described with reference to the drawings.

Figure 1:
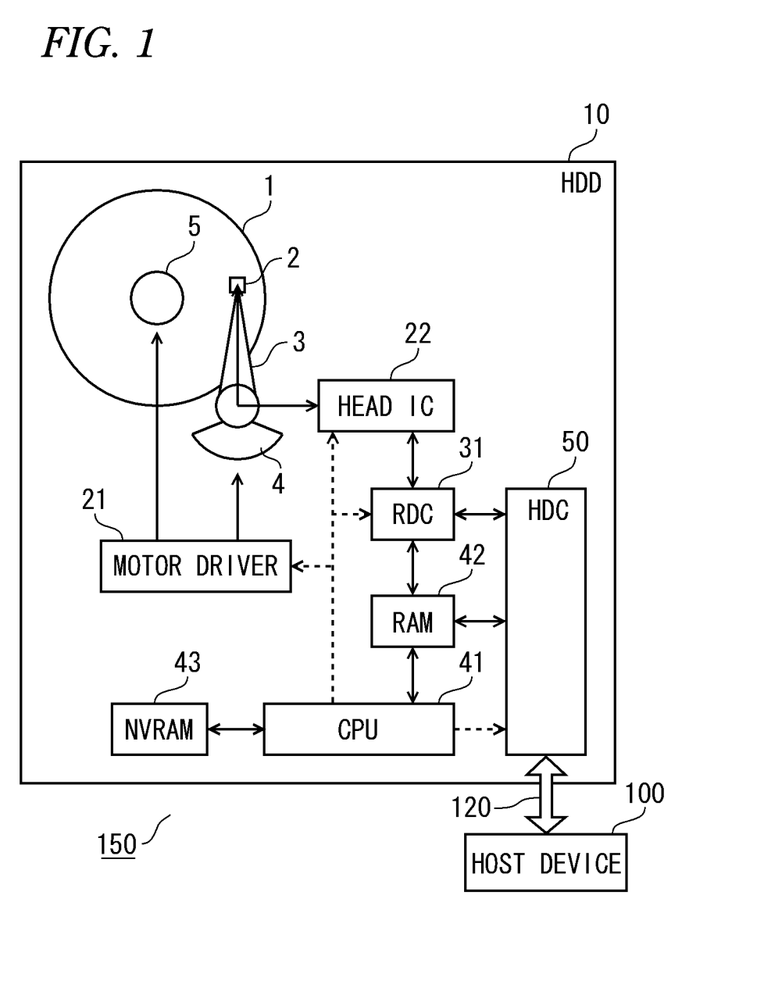
FIG. 1 is an exemplary block diagram showing the configuration of an electronic apparatus which is equipped with a magnetic disk device (HDD) as an example of an information recording device according to an embodiment.

FIG. 1 is an exemplary block diagram showing the configuration of an electronic apparatus 150 which is equipped with a magnetic disk device (hereinafter also referred to as HDD) 10 as an information recording device according to the embodiment. The electronic apparatus 150 is also equipped with a host device 100. The HDD 10 is connected to the host device 100 via a communication medium (host I/F) 120 and functions as a storage module of the host device 100. The host I/F 120 connects the host device 100 and the HDD 10 and is used for exchanging data and commands between the host device 100 and the HDD 10. For example, the electronic apparatus 150 is a personal computer and the host device 100 is a central processing unit (CPU) of the personal computer.

The HDD 10 according to the embodiment is equipped with mechanism components such as a magnetic disk 1, a slider 2, an arm 3, a voice coil motor (VCM) 4, and a spindle motor (SPM) 5. The HDD 10 is also equipped with circuit blocks such as a motor driver 21, ahead IC 22, a read/write channel IC (hereinafter also referred to as RDC) 31, a CPU 41, a RAM 42, an NVRAM 43, and a hard disk controller (HDC) 50.

In the HDD 10 according to the embodiment, information is recorded on the magnetic disk 1 by a write head (not shown) which is provided on the slider 2. To record information on the recording surface of the magnetic disk 1, the recording technique called "shingled-recording method" is used. The shingled-recording method is a recording method in which recording is performed on a track defined on the magnetic disk 1 in such a manner that overwriting is performed on part of an adjacent track (partial overwriting). In the shingled-recording method, a track group including plural adjacent tracks is defined as a unit of recording. When information is to be newly recorded on a midway track of the tracks of a track group, the entire track group is subjected to rewriting (subjecting only the midway track to rewriting is not possible). In the HDD 10, when a drifted-off writing is detected, information may be written to not only the recording track but also a track adjacent to it. The drifted-off writing is a phenomenon that information is recorded erroneously on a track that is adjacent to a true recording track due to a shift (drift) of the recording head during the recording. In the HDD 10 according to the embodiment, in the shingled-recording method, information rewriting is performed properly on a recording track and a track that is adjacent to the recording track and on which the recording track is overlapped.

Fixed to the SPM 5, the magnetic disk 1 is rotated being driven by the SPM 5. At least one surface of the magnetic disk 1 is a recording surface on which information is recorded magnetically. For example, plural concentric tracks are defined on the recording surface and each track has servo regions and data regions. Position information to be used for detecting a radial deviation from the track center in positioning of the slider 2 on the recording surface of the magnetic disk 1 is recorded in each servo region. In the embodiment, information recording on the magnetic disk 1 is performed by the shingled-recording method.

The slider 2 is provided at one end of the arm 3 so as to be opposed to the recording surface of the magnetic disk 1. The slider 2 is provided with a read head and a write head (neither of which is shown). The read head reads a signal that is magnetically recorded on the recording surface of the magnetic disk 1. The read-out signal is output to the head IC 22 via conductor patterns formed on the arm 3. The write head magnetically records, on the recording surface of the magnetic disk 1, a write signal (write current) that is input from the head IC 22 via conductor patterns formed on the arm 3.

The arm 3 is provided with the slider 2 at one end and with a bearing portion (not shown) at the other end. The arm 3 is rotated with the bearing portion as a rotation center according to a drive current that is supplied to the VCM 4, and thereby moves the slider 2 in the radial direction over the recording surface of the magnetic disk 1.

The VCM 4 is driven according to a drive signal (current) that is supplied from the motor driver 21, and thereby rotates the arm 3.

The SPM 5 is driven according to a drive signal (current) that is supplied from the motor driver 21, and thereby rotates the magnetic disk 1.

The motor driver 21 supplies the VCM 4 and the SPM 5 with drive signals (currents) for driving them on the basis of control signals supplied from the CPU 41, respectively.

The head IC 22 amplifies a signal that is input from the read head of the slider 2 via the conductor patterns formed on the arm 3, and outputs an amplified signal to the RDC 31 as read information. Furthermore, the head IC 22 outputs a write signal (write current) corresponding to recording information that is input from the RDC 31, to the write head of the slider 2 via the conductor patterns formed on the arm 3.

The RDC 31 decodes read information that is input from the head IC 22 by performing prescribed processing on it, and outputs resulting decoded information to the HDC 50. Furthermore, the RDC 31 encodes recording subject information that is input from the HDC 50 by performing prescribed processing on it, and outputs resulting coded information to the head IC 22 as recording information. The RDC 31 detects servo intervals, indicating servo regions, of the read information, and extracts pieces of position information from signals in the detected servo intervals. The extracted pieces of position information are output to the CPU 41. The RDC 31 uses the RAM 42 as a work memory in performing the above pieces of processing.

The CPU 41 is a processor for controlling the individual blocks of the HDD 10 according to programs stored in the NVRAM 43. For example, the CPU 41 controls operations of rotating the VCM 4 and the SPM 5 and recording information on the magnetic disk 1. The CPU 41 functions as a servo controller or a read/write controller depending on the content of a program being run. The CPU 41 uses the RAM 42 as a work memory in running the programs.

In the embodiment, where the CPU 41 functions as a read/write controller, information is recorded on the magnetic disk 1 by the shingled-recording method. Furthermore, the CPU 41 detects a radial deviation (positional error) from the center of a recording track on the basis of position information that is input from the RDC 31, and outputs a control signal for correcting for the deviation to the motor driver 21. The radial deviation of the slider 2 (more specifically, the read head or the write head of the slider 2) with respect to the recording track is corrected for as a result of driving of the VCM 4 by the motor driver 21. As such, the CPU 41 functions as a servo controller which is part of a feedback servo loop.

In the embodiment, the CPU 41 recognizes a radial deviation (positional error) from the center of a recording track on the basis of position information that is input from the RDC 31. The CPU 41 then determines to which way in the radial direction the slider 2 is deviated, and compares the deviation with plural prescribed values. That is, the CPU 41 detects occurrence of a drifted-off writing every servo interval during recording of the shingled-recording method. Upon detection of a drifted-off writing, if necessary, the CPU 41 performs rewriting on not only a recording track but also a track adjacent to it. This information rewriting location is determined on the basis of the servo regions.

The RAM 42 is a work memory for the RDC 31, the CPU 41, and the HDC 50. The RAM 42 is a DRAM which is a volatile memory.

The NVRAM 43 is a nonvolatile memory for storing the programs to be run by the CPU 41. The programs stored in the NVRAM 43 can be updated. The NVRAM 43 also stores parameter values to be used in processing performed by the CPU 41.

The HDC 50 performs communication processing of transmitting and receiving information to and from the host device 100. The HDC 50 encodes decoded information that is input from the RDC 31 by performing prescribed processing on it, and transmits resulting coded information to the host device 100 as transmission information. The HDC 50 decodes reception information received from the host device 100 by performing prescribed processing on it, and outputs resulting decoded information to the RDC 31 as recording subject information. For example, the HDC 50 performs communication processing that complies with the serial advanced technology attachment (SATA) standard to communicate with the host device 100. When receiving, from the host device 100, a write command containing information indicating a logical address from which to start data recording and a recording data length, the HDC 50 extracts the information indicating the logical address and the recording data length from the received write command and outputs the extracted information indicating the logical address and the recording data length to the CPU 41.

In the above-configured HDD 10 according to the embodiment, information is recorded on the magnetic disk 1 by the plural blocks of the HDD 10 by the shingled-recording method. When a drifted-off writing is detected, if necessary, the CPU 41 performs rewriting on not only a recording track but also a track adjacent to it. Upon occurrence of the drifted-off writing, it is determined to which way in the radial direction the slider 2 is deviated with respect to the recording track. The detected deviation is compared with the deviation with the plural prescribed values. In this manner, in the shingled-recording method, the HDD 10 according to the embodiment can properly perform information rewriting on a recording track and an adjacent track that is adjacent to the recording track and on which the recording track is overlapped.

Next, an information rewriting process which is performed by the HDD 10 according to the embodiment in response to detection of a drifted-off writing will be described with reference to a flowchart of FIG. 2.

Figure 2:
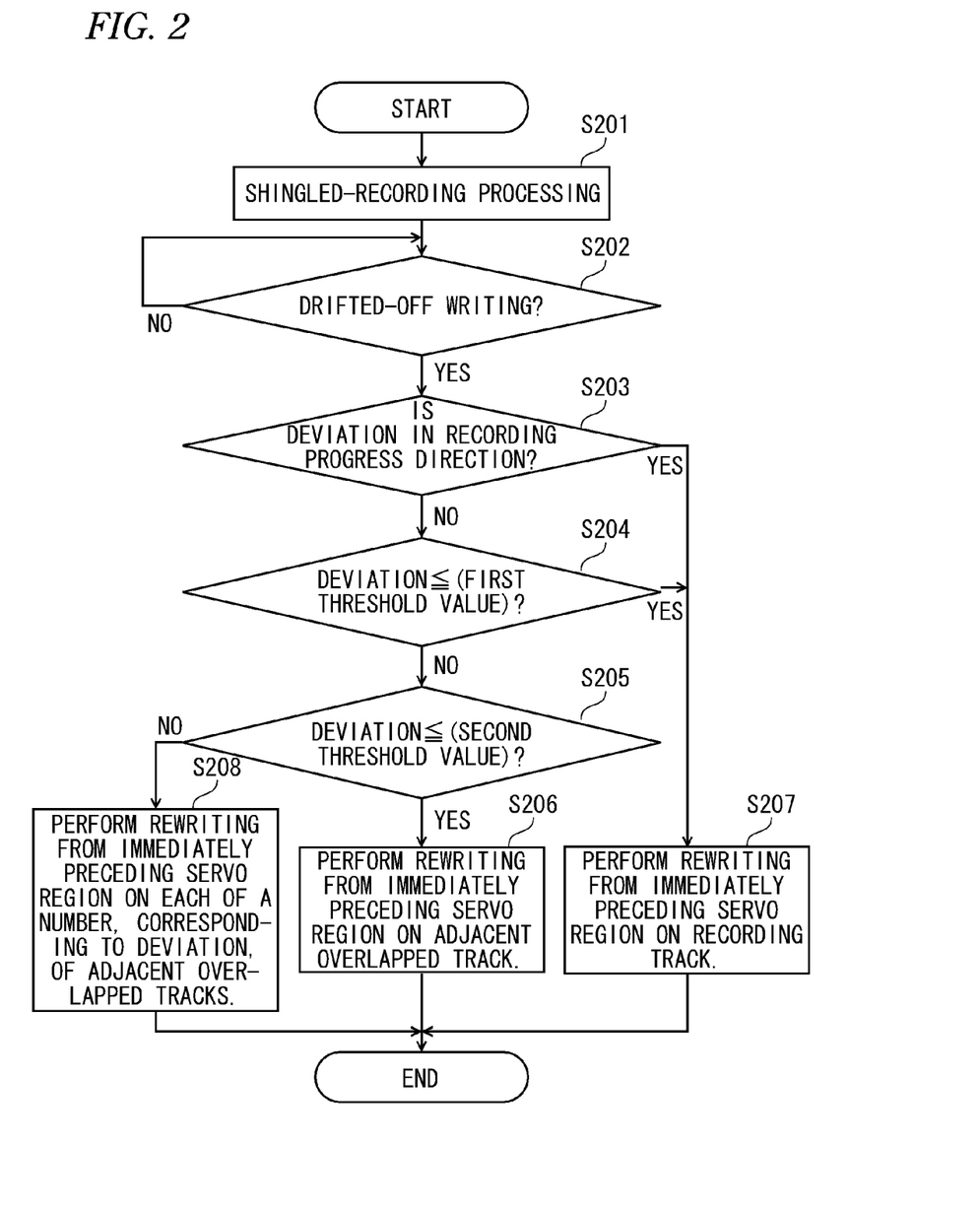
FIG. 2 is an exemplary flowchart of an information rewriting process which is performed by the HDD according to the embodiment in response to detection of a drifted-off writing.

FIG. 2 is an exemplary flowchart of an information rewriting process which is performed by the HDD 10 according to the embodiment in response to detection of a drifted-off writing.

First, at step S201, recording processing of the shingled-recording method (shingled-recording processing) is performed with the CPU 41 functioning as a read/write controller. At step S202, the CPU 41 determines whether or not a drifted-off writing was detected during the shingled-recording processing. When no drifted-off writing was detected (S202: no), step S202 is performed again. On the other hand, when a drifted-off writing was detected (S202: yes), it is determined at step S203 to which way in the radial direction the deviation occurred with respect to the center of the recording track.

When the deviation occurred in the recording progress direction (i.e., the direction from the recording track to the adjacent track to be overlapped on the recording track; S203: yes), at step S207 information rewriting is performed on the recording track in such a manner that the servo region that belongs to the recording track and immediately precedes the servo region where the drifted-off writing was detected is made a start position. Although the information rewriting start position may be any servo position that precedes the servo region where the drifted-off writing was detected, the following description will be made with an assumption that it is the immediately preceding servo region.

On the other hand, when the deviation (positional error) occurred in the direction opposite to the recording progress direction (i.e., the deviation occurred in the direction from the recording track to the adjacent track on which the recording track is overlapped; S203: no), a magnitude relationship between this deviation and a firth threshold value is determined at step S204. When the deviation is smaller than or equal to the first threshold value (S204: yes), at step S207 information rewriting is performed on the recording track in such a manner that the servo region (second servo region) that belongs to the recording track and immediately precedes the servo region (first servo region) where the drifted-off writing was detected is made a start position.

On the other hand, is the deviation is larger than the first threshold value (S204: no), a magnitude relationship between this deviation and a second threshold value is determined at step S205. When the deviation is larger than the first threshold value and smaller than or equal to the second threshold value (S205: yes), at step S206 information rewriting is performed on the adjacent track in such a manner that the servo region (fourth servo region) that belongs to the adjacent track on which the recording track is overlapped and immediately precedes the servo region (third servo region) that is adjacent, in the radial direction, to the servo region (first region) that belongs to the recording track and where the drifted-off writing was detected is made a start position.

The information rewriting on the adjacent track is performed on the data region between the fourth servo region and the third servo region. Upon completion of the information rewriting on the adjacent track, information rewriting is performed on the recording track in such a manner that the servo region (second servo region) that belongs to the recording track and immediately precedes the servo region (first servo region) where the drifted-off writing was detected is made a start position.

Returning to the flowchart of FIG. 2, at the determination of the magnitude relationship between the deviation and a second threshold value (S205), when the deviation is larger than (the first threshold value and) the second threshold value (S205: no), at step S208 information rewriting is performed on a number, corresponding to the deviation, of tracks.

In any case, when a drifted-off writing is detected, information rewriting is performed on at least the recording track in such a manner that the servo region (second servo region) that belongs to the recording track and immediately precedes the servo region (first servo region) where the drifted-off writing has been detected is made a start position.

In the HDD 10 according to the embodiment, information rewriting processing is performed in the above-described manner in response to detection of a drifted-off writing. In the information rewriting according to the embodiment, a rewriting location(s) is determined according to the length and the direction of a radial deviation from the center of the recording track at a recording location where the drifted-off writing has been detected. The information rewriting processing is performed in units of a data region between two servo regions that are adjacent to each other in the circumferential direction on the track. In this manner, in the HDD 10 according to the embodiment, in the shingled-recording method, information rewriting on a recording track and an adjacent track that is adjacent to the recording track and on which the recording track is overlapped can be performed properly.

Next, a specific example of drifted-off writing that occurs in the HDD 10 according to the embodiment will be described with reference to FIG. 3.

Figure 3:
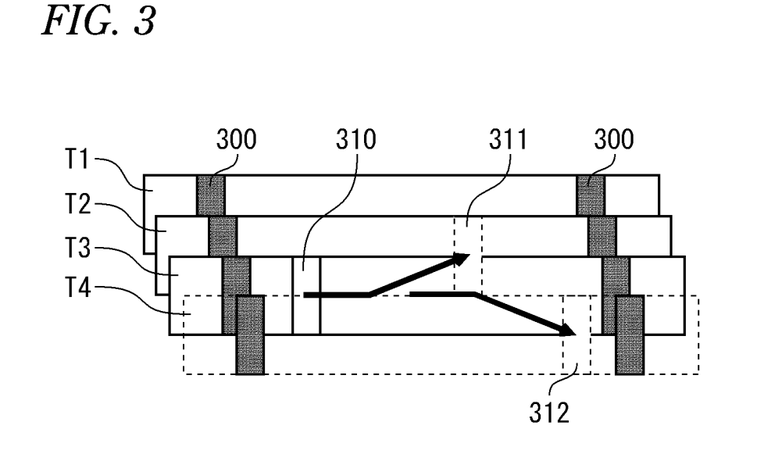
FIG. 3 shows a specific example of drifted-off writing that occurs in the HDD according to the embodiment.

FIG. 3 shows a specific example of drifted-off writing that occurs in the HDD according to the embodiment.

In the specific example of FIG. 3, track T2 is recorded so as to be partially overlapped on track T1. Likewise, track T3 is recorded so as to be partially overlapped on track T2 and track T4 is recorded so as to be partially overlapped on track T3. In each of tracks T1 to T4, servo regions 300 are detected at prescribed intervals. Information is recorded in such a manner that the servo regions 300 of each of tracks T1 to T4 are skipped.

The following description will be made of an example case of recording information on track T3. In recording information on track T3, a locus 310 of the recording head is controlled so as to move along track T3 with its center line as a target.

For example, assume a drifted-off writing in which the locus 310 of the recording head has shifted (deviated) toward track T2. In this case, as shown in FIG. 3, when a recording head locus 311 that is shifted toward track T2 occupies track T2 almost fully in the width direction, the information recorded on track T2 would be overwritten and destroyed. Furthermore, since the recording head locus 311 occupies only part of track T3 in the radial direction, information to be recorded on track T3 would not be recorded there correctly. In this case, information rewriting needs to be performed on not only track T3 but also track T2.

Assume another drifted-off writing in which the locus 310 of the recording head has shifted (deviated) toward track T4. In this case, as shown in FIG. 3, since a recording head locus 312 that is shifted toward track T4 occupies only part of track T3 in the radial direction, information to be recorded on track T3 would not be recorded there correctly. Furthermore, when the recording head locus 312 occupies track T4 almost fully in the width direction, it is easily expected that the information recorded on track T4 would be overwritten and erased when information is newly recorded there. In this case, information rewriting needs to be performed on track T3.

As described above, when a drifted-off writing occurs during information recording of the shingled-recording method, it is necessary to determine an information rewriting location(s) needs to be determined according to the length and the direction of a radial deviation from the center of the recording track. A drifted-off writing may be detected in such a manner that a radial deviation is in either the recording progress direction or the direction opposite to it.

Next, specific threshold value examples that are set for information rewriting processing which is performed in the HDD 10 according to the embodiment in response to detection of a drifted-off writing will be described with reference to FIG. 4.

Figure 4:
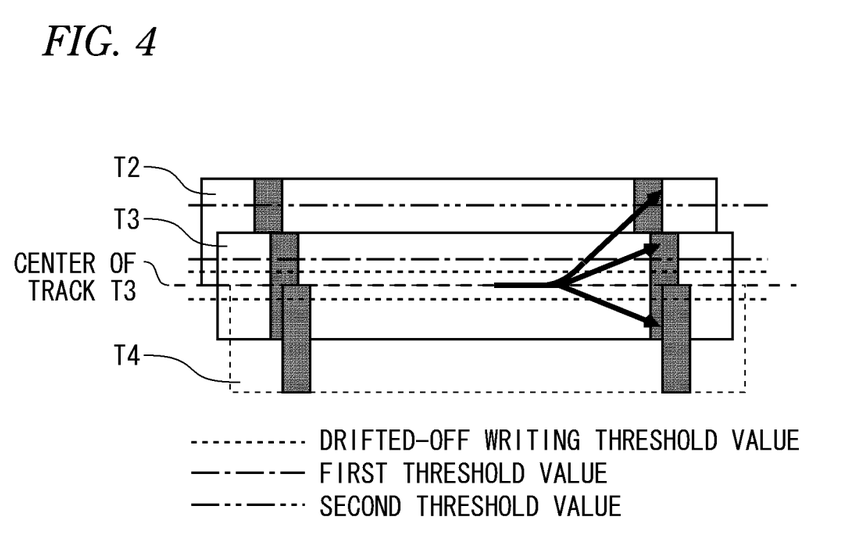
FIG. 4 illustrates specific threshold value examples that are set for information rewriting processing which is performed in the HDD according to the embodiment in response to detection of a drifted-off writing.

FIG. 4 illustrates specific threshold value examples that are set for information rewriting processing which is performed in the HDD according to the embodiment in response to detection of a drifted-off writing.

In the HDD 10 according to the embodiment, three threshold values are set as shown in FIG. 4. The three threshold values are threshold values for a radial deviation from the center of a recording track of information recording of the shingled-recording method. FIG. 4 illustrates relationships between the specific threshold value examples and a drifted-off writing that is detected when information is being recorded on track T3 by the shingled-recording method.

One of the three threshold values is a drive off writing threshold value for detecting occurrence of a drifted-off writing. As suggested above, the drive off writing threshold value is set for both sides, in the radial direction, of a recording track T3.

Another of the three threshold values is the first threshold value, which is a threshold value for determining whether to perform information rewriting on the adjacent track on which the recording track T3 is overlapped. When the deviation is smaller than or equal to the first threshold value, information rewriting is performed on the recording track T3. When the deviation is larger than the first threshold value, information rewriting is performed on at least the recording track T3 and the adjacent track on which the recording track T3 is overlapped. The first threshold value is set in the direction opposite to the recording progress direction in the radial direction, and is not set in the recording progress direction. In other words, a deviation in the recording progress direction that is larger than the drifted-off writing threshold value is disregarded.

The last one of the three threshold values is the second threshold value. The second threshold value is a threshold value for determining whether to perform information rewriting on not only the recording track T3 and the adjacent track on which the recording track T3 is overlapped but also other tracks that are located on the same side of the recording track T3 as this adjacent track. When the deviation is smaller than or equal to the second threshold value and larger than the first threshold value, information rewriting is performed on the recording track T3 and the adjacent track on which the recording track T3 is overlapped. When the deviation is smaller than the second threshold value, information rewriting is performed on the recording track T3, the adjacent track on which the recording track T3 is overlapped, and other tracks that are located on the same side of the recording track T3 as this adjacent track. The second threshold value is set in the direction opposite to the recording progress direction in the radial direction, and is not set in the recording progress direction. In other words, a deviation in the recording progress direction that is larger than the drifted-off writing threshold value is disregarded.

As described above, in the embodiment, the three threshold values are set for information rewriting processing to be performed in response to detection of a drifted-off writing. The three threshold values have the following magnitude relationship: (drifted-off writing threshold value)<(first threshold value)<(second threshold value). An information rewriting location(s) is determined by comparing a radial deviation from the center of a recording track with the three threshold values. In this manner, in the HDD 10 according to the embodiment, in the shingled-recording method, information rewriting on a recording track and an adjacent track that is adjacent to the recording track and on which the recording track is overlapped can be performed properly.

Next, specific examples of information rewriting processing which is performed by the HDD 10 according to the embodiment in response to detection of a drifted-off writing will be described with reference to FIGS. 5A and 5B.

Figure 5A:
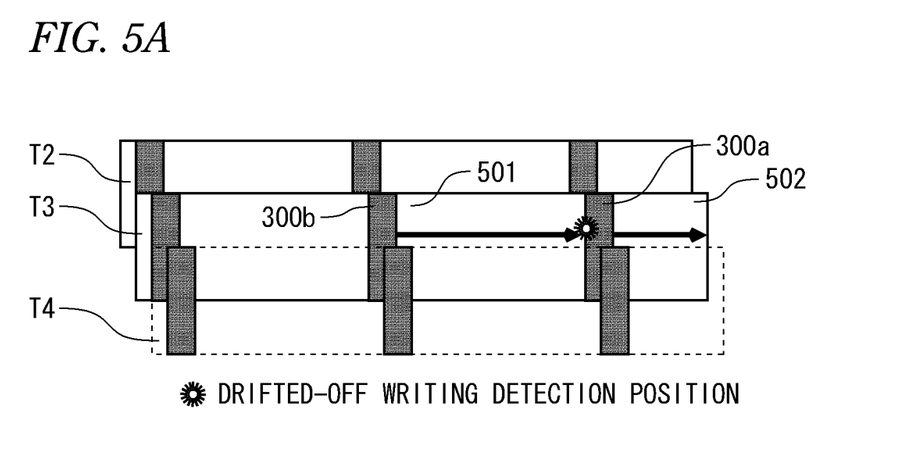
FIGS. 5A and 5B illustrate specific examples of information rewriting processing which is performed by the HDD according to the embodiment in response to detection of a drifted-off writing.
Figure 5B:
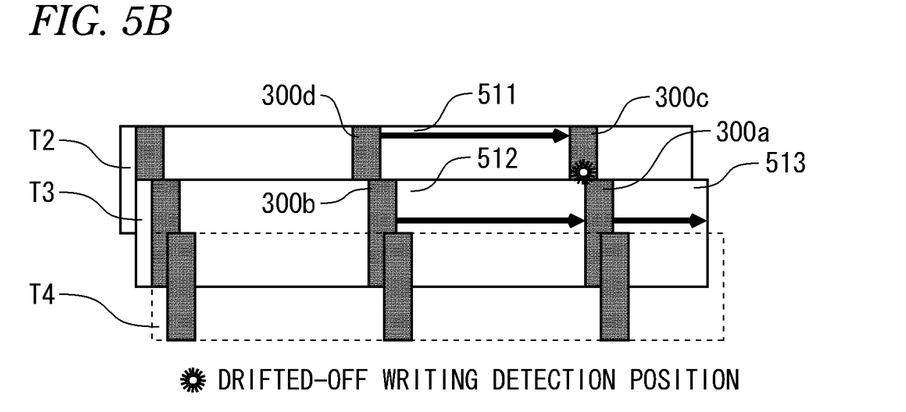

FIGS. 5A and 5B illustrate specific examples of information rewriting processing which is performed by the HDD according to the embodiment in response to detection of a drifted-off writing.

As in the example of FIG. 4, the specific example of FIGS. 5A and 5B corresponds to a case that a drifted-off writing is detected when information is being recorded on track T3 by the shingled-recording method.

The specific example of FIG. 5A corresponds to a case that a drifted-off writing that is in the direction toward track T2 is detected in a servo region 300a when information is being recorded on track T3 and a radial deviation from the center of track T3 is smaller than or equal to the first threshold value. In this example, information rewriting is performed on track T3 in such a manner that a servo region 300b that belongs to track T3 and immediately precedes the servo region 300a where the drifted-off writing has been detected is made a start position. That is, information rewriting processing is performed on a data region 501 between the servo regions 300b and 300a. After this information rewriting processing, information recording is performed on a data region 502 that follows the servo region 300a.

The specific example of FIG. 5B corresponds to a case that a drifted-off writing that is in the direction toward track T2 is detected in a servo region 300a when information is being recorded on track T3 and a radial deviation from the center of track T3 is larger than the first threshold value and smaller than or equal to the second threshold value. In this example, information rewriting is performed on not only track T3 but also track T2.

More specifically, information rewriting is performed on track T2 in such a manner that a servo region 300d that belongs to track T2 and immediately precedes a servo region 300c that is adjacent, in the radial direction, to the servo region 300a that belongs to track T3 and where the drifted-off writing has been detected is made a start position. The information rewriting starting from the servo region 300d of track T2 is performed on a data region 511 between the servo regions 300d and 300c. Upon completion of the information rewriting processing on the data region 511, information rewriting processing is performed on track T3.

The information rewriting on track T3 is performed in such a manner that a servo region 300b that belongs to track T3 and immediately precedes the servo region 300a where the drifted-off writing has been detected is made a start position. That is, information rewriting processing is performed on a data region 501 between the servo regions 300b and 300a. That is, the information rewriting processing is performed on a data region 512 between the servo regions 300b and 300a. After this information rewriting processing, information recording is performed on a data region 513 that follows the servo region 300a.

In this manner, in the information rewriting processing which is performed in the HDD 10 according to the embodiment in response to detection of a drifted-off writing, an information rewriting location(s) is determined according to the length and the direction of a radial deviation from the center of a recording track. The information rewriting processing according to the embodiment is performed in units of a data region between two servo regions that are adjacent to each other in the circumferential direction on the rewriting subject track. In this manner, in the HDD 10 according to the embodiment, in the shingled-recording method, information rewriting on a recording track and an adjacent track that is adjacent to the recording track and on which the recording track is overlapped can be performed properly.

As described above, in the embodiment, information is recorded on the magnetic disk 1 by the shingled-recording method. When a drifted-off writing is detected during information recording, an information rewriting location(s) is determined according to the length and the direction of a radial deviation from the center of a recording track. The information rewriting processing according to the embodiment is performed in units of a data region between two servo regions that are adjacent to each other in the circumferential direction on the track. Since a rewriting location(s) is restricted in performing information rewriting, occurrence of a new drifted-off writing event can be suppressed. Furthermore, since information rewriting is performed in units of a data region between two servo regions that are adjacent to each other in the circumferential direction on a track, there is no concept of "sector" as a unit of information recording, which can prevent new problems that relate to successive writing of pieces of information on a track. As such, in the HDD 10 according to the embodiment, in the shingled-recording method, information rewriting on a recording track and an adjacent track that is adjacent to the recording track and on which the recording track is overlapped can be performed properly.

The invention is not limited to the above embodiment, and various changes, alterations, etc. are possible without departing from the spirit and scope of the invention. And various inventions can be conceived by properly combining plural constituent elements disclosed in the embodiment. For example, several ones of the constituent elements of the embodiment may be omitted.

What is claimed is:

1. An information recording device comprising:
   a magnetic disk comprising a plurality of tracks, wherein each of the plurality of tracks comprises servo regions comprising position information and data regions;
   a recording controller configured to record information on a first track by recording each part of adjacent tracks of the plurality of tracks overlapped with each other;
   a detector configured to detect, based on first position information from a first servo region, whether a shift recording is performed causing a shift from a reference in a radial direction on the first track in parallel with the information recording on the first track; and
   a rewrite controller configured to re-record information, when the shift recording is detected, in a first data region between the first servo region and a second servo region that precedes the first servo region, wherein the first servo region is related to the first position information.

2. The information recording device of claim 1,
   wherein the detector is configured to detect whether a shift recording toward a second track is performed based on a result of a comparison between a first threshold value and a shift length of a recording position toward the second track from the reference in the radial direction on the first track, wherein the second track is adjacent to the first track and on which the first track is overlapped, wherein the shift length is based on the first position information; and
   wherein the rewrite controller is configured to re-record information, when the shift recording toward the second track is detected, in the first data region between the first servo region and the second servo region, wherein the first servo region is related to the first position information.

3. The information recording device of claim 2,
   wherein the detector is configured to detect whether a shift recording to the second track is performed based on a result of a comparison between the first threshold and a second threshold value, wherein the second threshold value is larger than the first threshold value and the shift length; and
   wherein the rewrite controller is configured to re-record information, when the shift recording to the second track is detected, in the first data region between the first servo region and the second servo region and a second data region between a third servo region that belongs to the second track and is adjacent to the first servo region in the radial direction and a fourth servo region that precedes the third servo region.

4. The information recording device of claim 3,
   wherein the detector is configured to detect whether a shift recording to a third track adjacent to the second track and on which the second track overlaps is performed, based on the result of the comparison between the shift length and the second threshold value; and
   wherein the rewrite controller is configured to re-record information, when the shift recording to the third track is detected, on the third track in units of a data region.

5. An information recording method in an information recording device comprising a magnetic disk comprising a plurality of tracks, wherein each of the plurality of tracks comprises servo regions comprising position information and data regions, the information recording method comprising:
   recording information on a first track by recording each part of adjacent tracks of the plurality of tracks overlapped with each other;
   detecting, based on first position information from a first servo region, whether a shift recording is performed causing a shift from a reference in a radial direction on the first track in parallel with the information recording on the first track; and
   re-recording information, when the shift recording is detected, in a first data region between the first servo region and a second servo region that precedes the first servo region, wherein the first servo region is related to the first position information.

6. The information recording method of claim 5, further comprising:
- detecting whether a shift recording toward a second track is performed based on a result of a comparison between a first threshold value and a shift length of a recording position toward the second track from the reference in the radial direction on the first track, wherein the second track is adjacent to the first track and on which the first track is overlapped, wherein the shift length is based on the first position information; and
- re-recording information, when the shift recording toward the second track is detected, in the first data region between the first servo region and the second servo region, wherein the first servo region is related to the first position information.

* * * * *